Aug. 31, 1926.　　　　　　　　　　　　　　1,598,156
J. SCHEIDEMAN
SECTIONAL WHEEL RIM FOR DEMOUNTABLE TIRES
Filed April 3, 1926　　　2 Sheets-Sheet 1
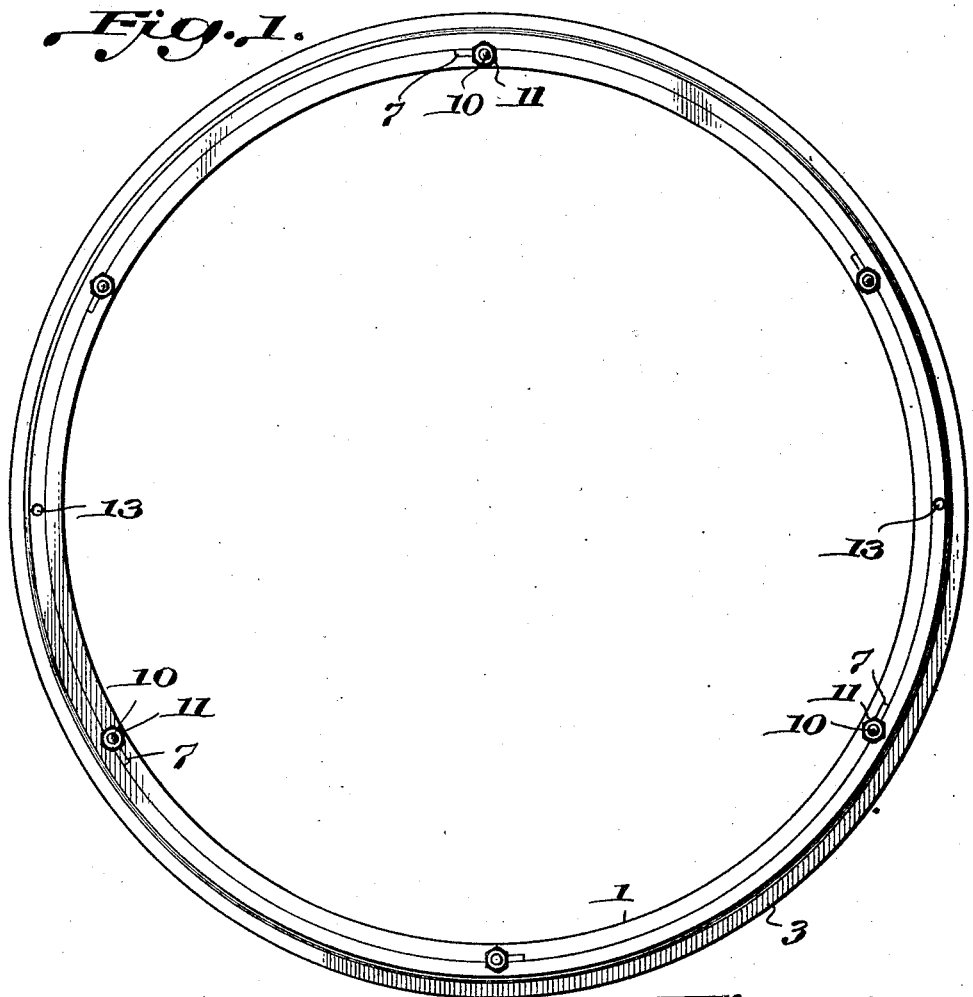
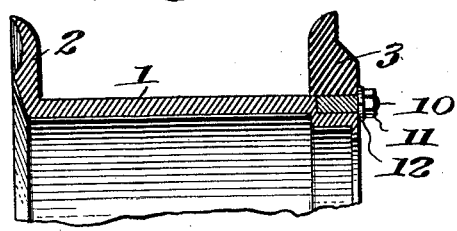
Inventor,
John Scheideman,
By　　　　　Atty.

Aug. 31, 1926. 1,598,156
J. SCHEIDEMAN
SECTIONAL WHEEL RIM FOR DEMOUNTABLE TIRES
Filed April 3, 1926   2 Sheets-Sheet 2
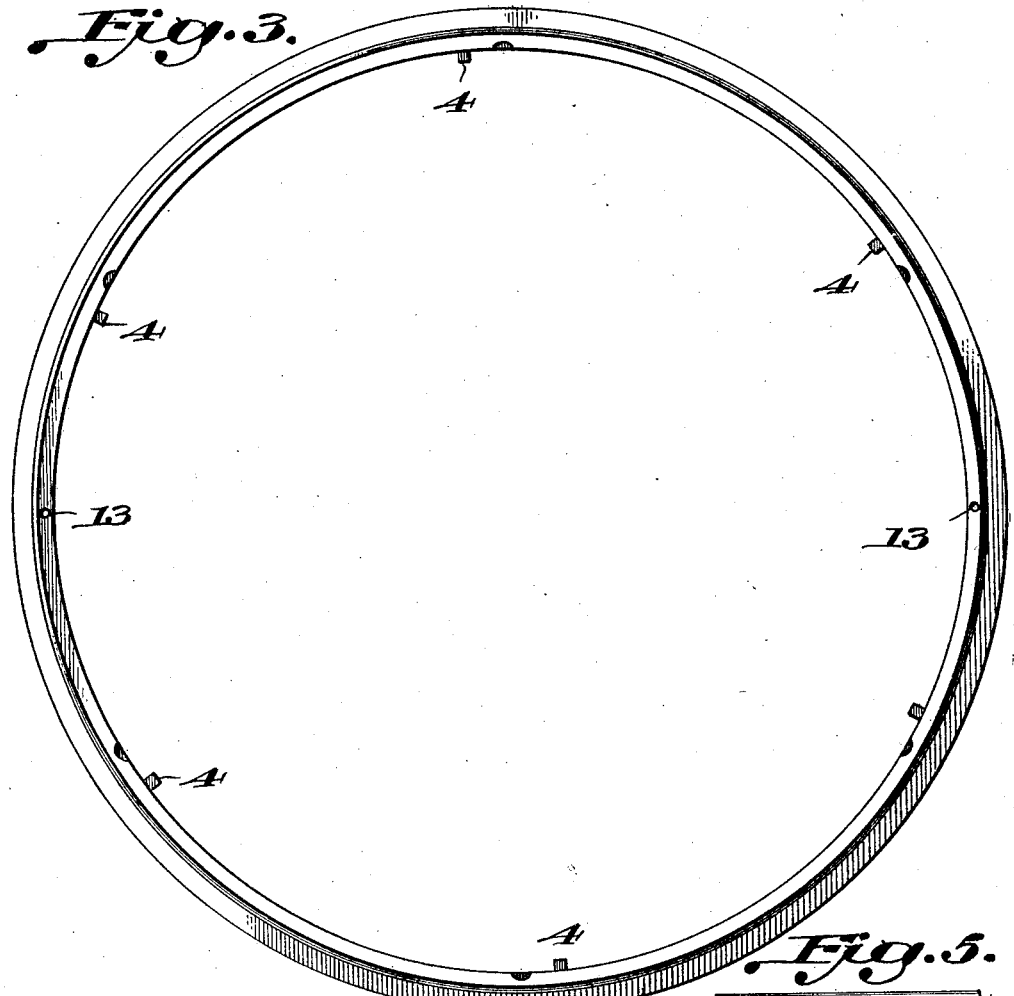
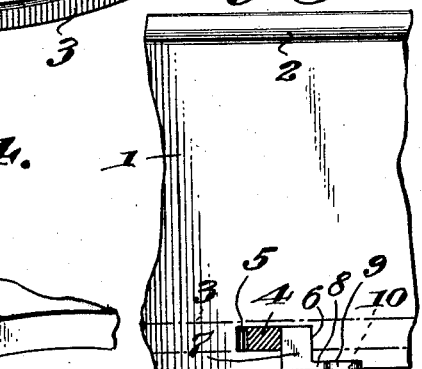
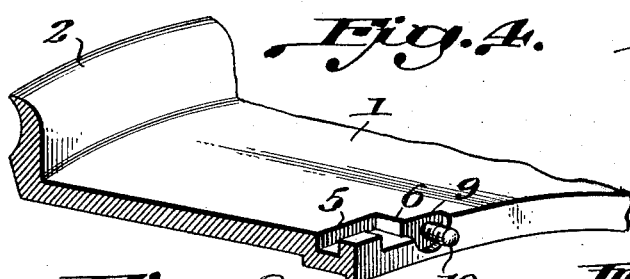

Patented Aug. 31, 1926.

1,598,156

UNITED STATES PATENT OFFICE.

JOHN SCHEIDEMAN, OF WASHINGTON, DISTRICT OF COLUMBIA.

SECTIONAL WHEEL RIM FOR DEMOUNTABLE TIRES.

Application filed April 3, 1926. Serial No. 99,646.

The invention relates to a sectional wheel rim for demountable tires.

The object of the present invention is to improve the construction of sectional wheel rims for demountable tires more especially the locking means for detachably securing the locking ring on the rim and to provide a simple, practical and efficient device of strong, durable and comparatively inexpensive construction capable of securely locking a removable tire engaging ring on the rim in interlocked relation with the same and capable of being readily removed to release the locking ring and permit the same to be readily disengaged from the rim.

A further object of the invention is to provide a locking ring and tire engaging device which when in position will be arranged in flush relation with the rim and present long projecting parts.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:—

Figure 1 is a side elevation of a sectional wheel rim constructed in accordance with this invention.

Fig. 2 is a transverse sectional view of the same.

Fig. 3 is a similar view of the locking ring.

Fig. 4 is a detail perspective view of a portion of the wheel rim.

Fig. 5 is a plan view partly in section of a portion of the rim showing one of the lugs locked in engagement therewith.

Fig. 6 is a detail perspective view of the locking member.

Fig. 7 is a detail perspective view of the split spring washer.

Fig. 8 is a detail plan view of a portion of the locking ring.

In the accompanying drawing in which is illustrated the preferred embodiment of the invention 1 designates a metallic rim provided at the inner side with an integral tire engaging flange 2 and having mounted on it at the outer side a detachable locking ring 3 provided at its inner face or periphery with radially projecting lugs 4 arranged at suitable intervals and engaging circumferential grooves 5 in the face of the rim adjacent the outer edge thereof. The circumferential grooves are arranged at regular intervals to correspond with the series of lugs of the locking ring and any number of grooves and coacting lugs may be provided as will be readily understood. Each of the grooves 5 at one end preferably the left hand end viewed from the outer edge of the rim has a portion of the outer wall removed to provide an entrance slot 6 corresponding in size to the lug 4 and adapted to form a passage for the lug when the locking ring is placed on the outer portion of the rim. After the locking ring is placed on the outer portion of the rim with the lugs 4 in the entrance slots of the grooves 5 the ring is moved inwardly until each lug contacts with the inner wall of its corresponding groove 5. The locking ring is then rotated to the left to carry the lugs 4 away from the entrance slots and to the opposite end of the grooves. This will interlock the locking ring with the rim and retain the locking ring firmly on the rim against lateral displacement. The groove is of a size to receive the lug in its pocket or closed end and the lugs are locked against circumferential movement by means of a locking member 7 consisting of a body portion of substantially rectangular form and of a size to fit the entrance slot 6 and to extend from the outer edge of the rim substantially across the groove and into a locking position with relation to the lug 4. When the locking member is in position the locking ring will be held against relative rotary movement on the rim. The locking member is provided with an arm 8 extending circumferentially of the rim and arranged in a recess 9 in the outer edge of the rim in flush relation with the same, the arm and the body portion of the locking member being in flush relation with the outer edge of the rim so as to present long projecting parts. The rim is provided at each of the recesses 9 with a projecting threaded stud 10 forming a bolt and passing through an eye 11 formed by an opening in the arm 8. The threaded stud receives a nut 11 which retains the locking device in its engaging position, a split corrugated spring washer 12 being preferably interposed between the nut and the arm of the locking member. The threaded studs which are arranged at intervals around the outer portion of the rim present the same appearance as the locking bolts of the ordinary demountable rim or tire and the locking device will enable the locking ring to be readily removed from and replaced on the rim. The locking ring is provided at diametrically opposite points with openings 13 adapted to receive a suitable tool for enabling the locking ring to be readily rotated to carry the lugs 4 to and from the entrance slots of the rim.

What is claimed is:

1. A sectional wheel rim comprising a continuous rim having a fixed tire engaging flange at the inner edge and provided adjacent the outer edge with a plurality of circumferential grooves formed in the face of the rim having a portion of the outer wall removed at one end to provide an entrance slot, a locking ring arranged on the rim and provided with inwardly extending radial lugs of a size to pass through the said entrance slots and to be carried into the circumferential grooves by a vertical rotary movement of the locking ring, a locking device comprising a body fitting in the entrance slot and extending across the groove and locking the lug thereof against circumferential movement, said locking device being provided with an arm arranged at the outer edge of the rim, threaded studs carried by the rim and projecting from the outer edge of the same and passing through the arm of each of the locking devices and nuts arranged on the threaded studs and retaining the locking devices in place.

2. A sectional wheel rim comprising a continuous rim provided at the inner edge with a fixed tire engaging flange and having adjacent to its outer edge a plurality of circumferential grooves, a portion of the outer wall of the grooves being removed at one end of the same to provide an entrance slot for each of the said grooves, said rim being also provided adjacent the said entrance slots with recesses located beyond the grooves, threaded studs mounted on the outer edge of the rim at the said recesses, a locking ring arranged on the rim and provided with radial lugs of a size to pass through the entrance slots and enter the said grooves and a locking member consisting of a body of a size to fit the entrance slots and extending across the grooves and provided with a circumferentially arranged arm adapted to fit in the said recesses and provided with an eye to receive the threaded studs and nuts arranged on the threaded studs for engaging the arms of the locking devices to retain the locking devices in their engaging position.

In testimony whereof I have hereunto set my hand.

JOHN SCHEIDEMAN.